US011119979B2

(12) United States Patent
Lapointe et al.

(10) Patent No.: US 11,119,979 B2
(45) Date of Patent: Sep. 14, 2021

(54) CONTENT BASED RECOMMENDATIONS OF FILE SYSTEM SAVE LOCATIONS

(71) Applicant: International Business Machines Corporation, Armonk, NY (US)

(72) Inventors: Michael Lapointe, Saugerties, NY (US); Jayapreetha Natesan, Hopewell Junction, NY (US); Chanchal Saha, Beacon, NY (US); Gerald Stanquist, Salt Point, NY (US); Jason Hirst, Poughkeepsie, NY (US); Richard B. Finch, New Paltz, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 254 days.

(21) Appl. No.: 16/049,005

(22) Filed: Jul. 30, 2018

(65) Prior Publication Data

US 2020/0034447 A1 Jan. 30, 2020

(51) Int. Cl.
*G06F 16/13* (2019.01)
*G06N 20/00* (2019.01)
*G06F 16/16* (2019.01)
*G06F 16/65* (2019.01)

(52) U.S. Cl.
CPC .............. *G06F 16/13* (2019.01); *G06F 16/16* (2019.01); *G06F 16/65* (2019.01); *G06N 20/00* (2019.01)

(58) Field of Classification Search
None
See application file for complete search history.

(56) References Cited

U.S. PATENT DOCUMENTS

| 9,805,042 B1 * | 10/2017 | Meyer ..................... G06F 16/16 |
| 9,852,377 B1 | 12/2017 | Kumar |
| 2009/0182739 A1 | 7/2009 | Crockett et al. |
| 2010/0094822 A1 | 4/2010 | Kelapure |
| 2015/0026225 A1 * | 1/2015 | Bastide ................. G06F 16/164 |
| | | 707/825 |
| 2018/0067957 A1 | 3/2018 | Paterson et al. |

* cited by examiner

*Primary Examiner* — Jason G Liao
(74) *Attorney, Agent, or Firm* — Cantor Colburn LLP; Tihon Poltavets (57) ABSTRACT

Systems and methods for content based routing are provided. Aspects include receiving, by a processor, a request to save a file. Analyzing, by the processor, data associated with the file. Determining one or more file save locations for the file based on a feature vector, generated by a machine learning model, comprising a plurality of features extracted from the data associated with the file and presenting the one or more file save locations to a user.

17 Claims, 5 Drawing Sheets

Legend:

61 – Mainframes
62 – RISC architecture based servers
63 – Servers
64 – Blade Servers
65 – Storage Devices
66 – Networks and Networking Components
67 – Software Components
68 – Database Software 71 – Virtual Servers
72 – Virtual Storage
73 – Virtual Networks
74 – Virtual private networks, virtual applications and operating systems
75 – Virtual Clients 81 – Resource provisioning
82 – Metering and Pricing
83 – User Portal
84 – Service Level Management
85 – SLA Planning and Fulfillment 91 – Mapping and Navigation
92 – Software Development and Lifecycle Management
93 – Data Analytics Processing
94 – Transaction Processing
95 – Content Based Routing

CONTENT BASED RECOMMENDATIONS OF FILE SYSTEM SAVE LOCATIONS

BACKGROUND

The present invention generally relates to file systems, and more specifically, to systems for content based routing of files to a directory.

Computer workstations are an integral part of everyday work for many individuals. During a typical workday, an individual may work on a host of projects and work functions. These projects and work functions will have associated files that are created, edited, and saved by an individual during the work day. The associated files are stored in file directories that allow for customization of file and folder names within the directory. Individuals often attempt to create folder names that can be easily navigated to and help immediately identify the types of files that are within the folder. Within each folder can be a host of sub-folders that require further labelling to help narrow down the types of files within the sub-folders. It can become tedious for an individual to manage large file directories and locate and store files in appropriate file locations.

SUMMARY

Embodiments of the present invention are directed to a computer-implemented method for a content based routing. A non-limiting example of the computer-implemented method includes receiving, by a processor, a request to save a file. Analyzing, by the processor, data associated with the file. Determining one or more file save locations for the file based on a feature vector, generated by a machine learning model, comprising a plurality of features extracted from the data associated with the file and presenting the one or more file save locations to a user.

Embodiments of the present invention are directed to a system for content based routing. A non-limiting example of the system includes receiving, by a processor, a request to save a file. Analyzing, by the processor, data associated with the file. Determining one or more file save locations for the file based on a feature vector, generated by a machine learning model, comprising a plurality of features extracted from the data associated with the file and presenting the one or more file save locations to a user.

Embodiments of the invention are directed to a computer program product for content based routing, the computer program product comprising a computer readable storage medium having program instructions embodied therewith. The program instructions are executable by a processor to cause the processor to perform a method. A non-limiting example of the method includes receiving, by a processor, a request to save a file. Analyzing, by the processor, data associated with the file. Determining one or more file save locations for the file based on a feature vector, generated by a machine learning model, comprising a plurality of features extracted from the data associated with the file and presenting the one or more file save locations to a user.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e.

two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
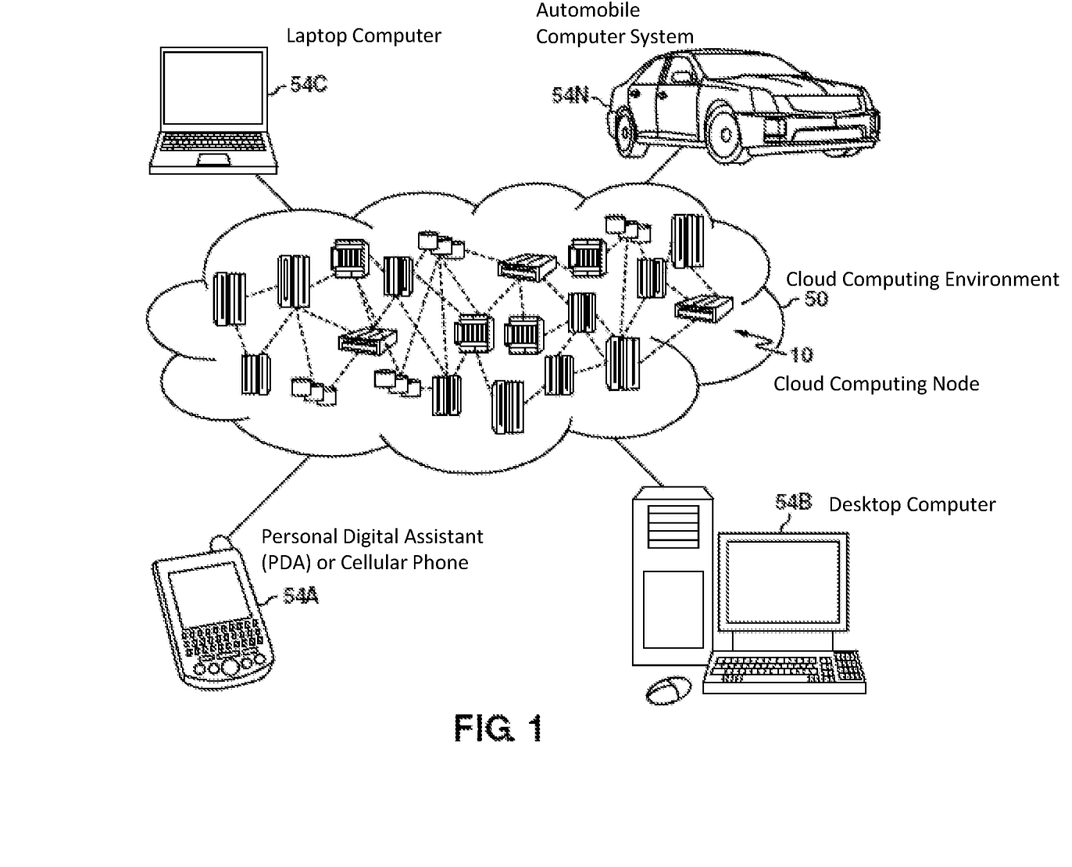
FIG. 1 depicts a cloud computing environment according to one or more embodiments of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
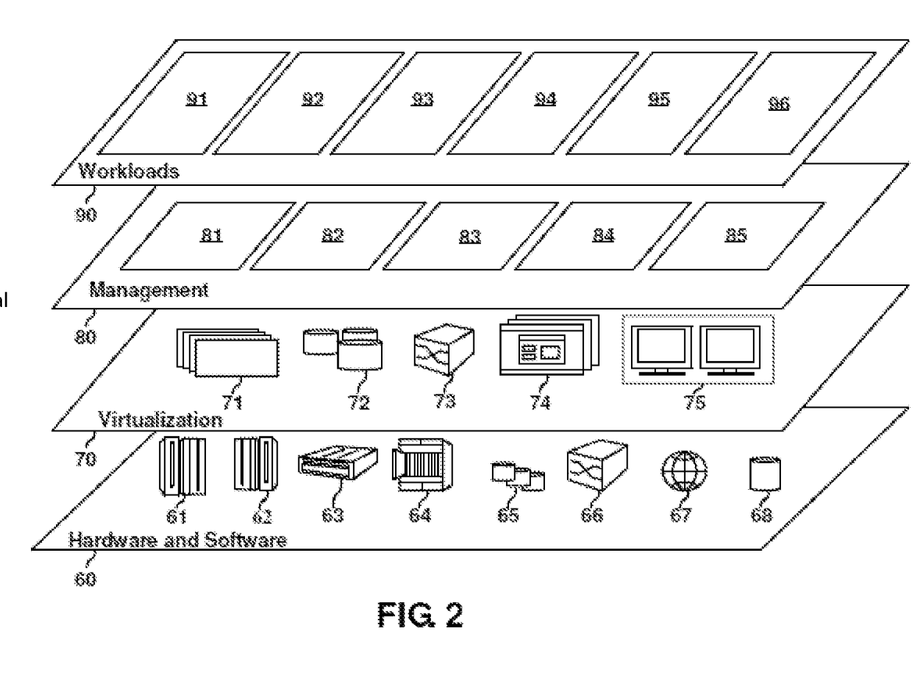
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and content based routing 96.

Figure 3:
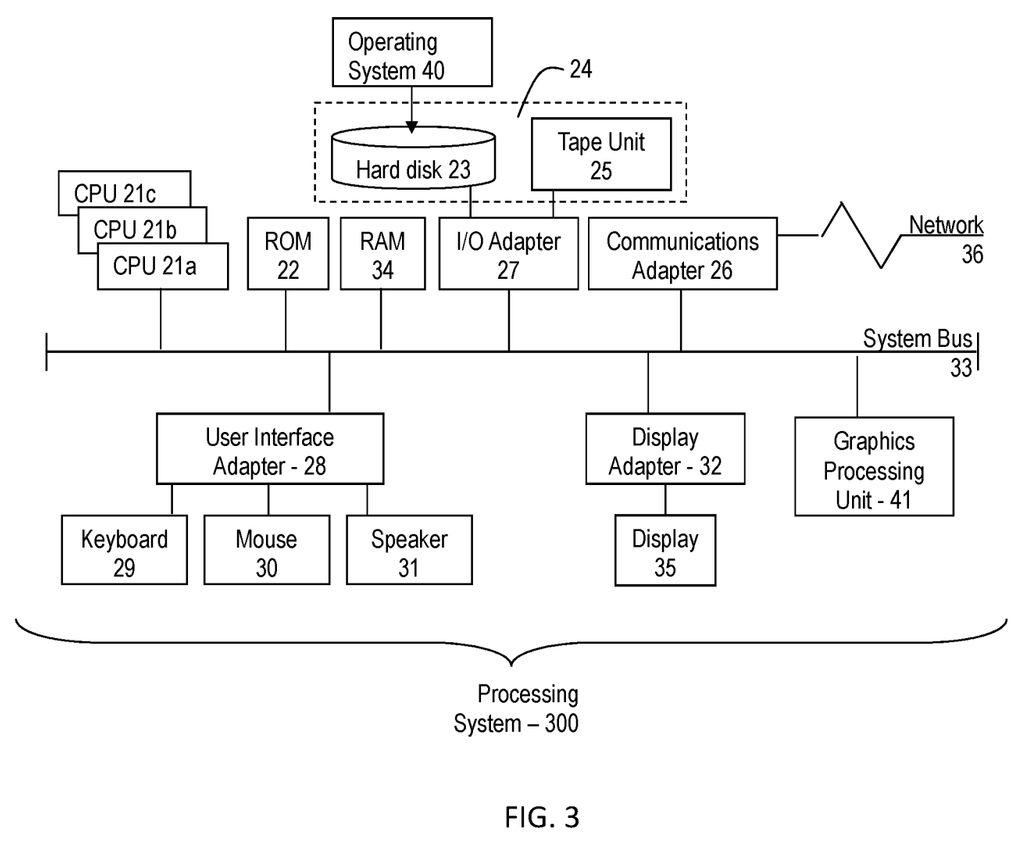
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

Turning now to an overview of technologies that are more specifically relevant to aspects of the invention, when saving files that are attached to emails or when working in other programs, the directory to which the files are saved is typically are default directory or to the directory the latest saved file was stored. Often times, it is time consuming to route a file to its designated directory location, especially when a user is pre-occupied with other work.

Turning now to an overview of the aspects of the invention, one or more embodiments of the invention address the above-described shortcomings of the prior art by providing content based routing in a file system. The content based routing can analyze a received or newly created file by looking at its file type and characteristics, sender or author, the file content (e.g., text, image, graphs, etc.) and recommend a file name and/or propose an existing directory to save the file. Also, if an existing directory does not exist or is not suitable for the file based on the analysis, the system can create a new directory with a proposed directory name for saving the file.

Figure 4:
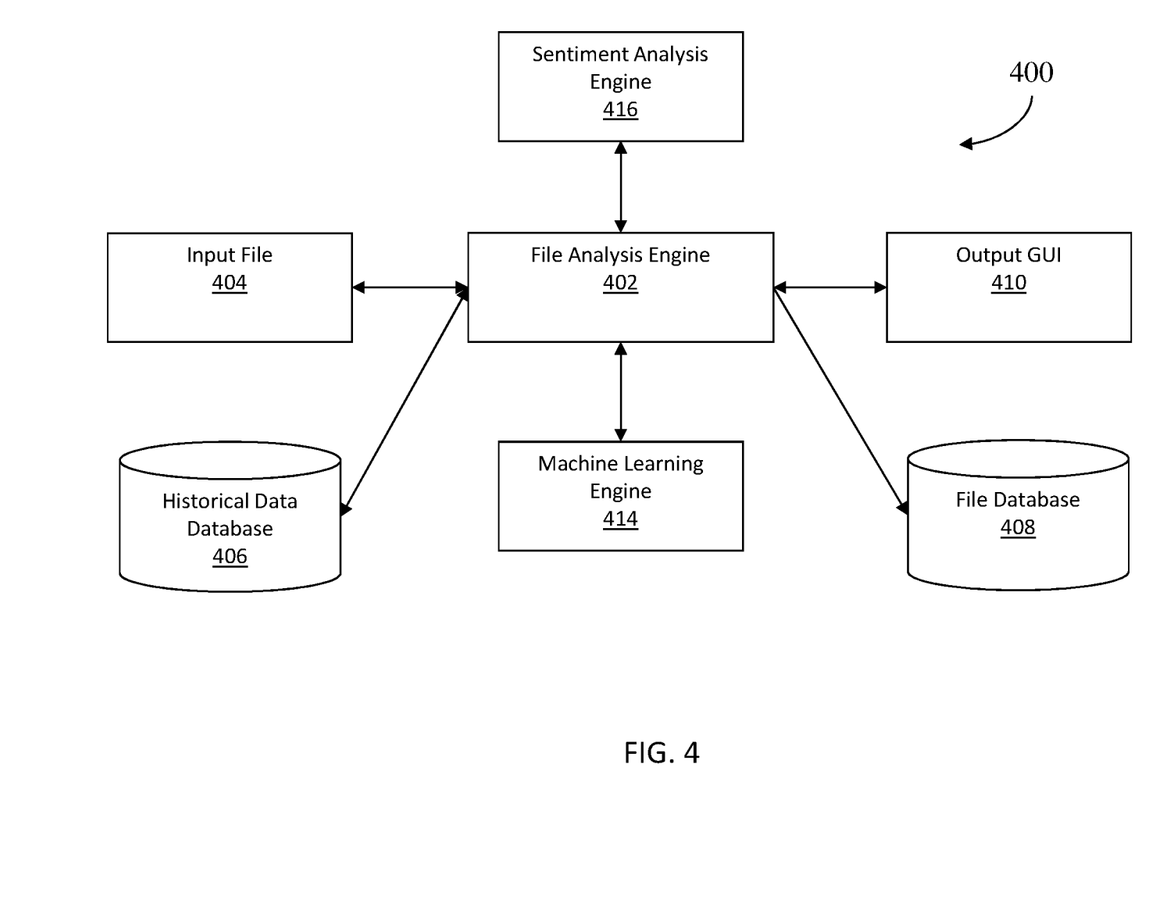
FIG. 4 depicts a system for content based routing according to embodiments of the invention.

Turning now to a more detailed description of aspects of the present invention, FIG. 4 depicts a system 400 for content based routing according to embodiments of the invention. The system 400 includes a file analysis engine 402 that can receive an input file 404 to be stored in a file database 408. The system 400 also includes a historical data database 406, a machine learning engine 414, a sentiment analysis engine 416, and an output graphical user interface (GUI) 410.

In embodiments of the invention, the engines 402, 414, 416 can also be implemented as so-called classifiers (described in more detail below). In one or more embodiments of the invention, the features of the various engines/classifiers (402, 414, 416) described herein can be implemented on the processing system 300 shown in FIG. 3, or can be implemented on a neural network (not shown). In embodiments of the invention, the features of the engines/classifiers 402, 414, 416 can be implemented by configuring and arranging the processing system 300 to execute machine learning (ML) algorithms. In general, ML algorithms, in effect, extract features from received data (e.g., inputs to the engines 402, 414, 416) in order to "classify" the received data. Examples of suitable classifiers include but are not limited to neural networks (described in greater detail below), support vector machines (SVMs), logistic regression, decision trees, hidden Markov Models (HMMs), etc. The end result of the classifier's operations, i.e., the "classification," is to predict a class for the data. The ML algorithms apply machine learning techniques to the received data in order to, over time, create/train/update a unique "model." The learning or training performed by the engines/classifiers 402, 414, 416 can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier. Unsupervised learning can utilize additional learning/training methods including, for example, clustering, anomaly detection, neural networks, deep learning, and the like.

In embodiments of the invention where the engines/classifiers 402, 414, 416 are implemented as neural networks, a resistive switching device (RSD) can be used as a connection (synapse) between a pre-neuron and a post-neuron, thus representing the connection weight in the form of device resistance. Neuromorphic systems are interconnected processor elements that act as simulated "neurons" and exchange "messages" between each other in the form of electronic signals. Similar to the so-called "plasticity" of synaptic neurotransmitter connections that carry messages between biological neurons, the connections in neuromorphic systems such as neural networks carry electronic messages between simulated neurons, which are provided with numeric weights that correspond to the strength or weakness of a given connection. The weights can be adjusted and tuned based on experience, making neuromorphic systems adaptive to inputs and capable of learning. For example, a neuromorphic/neural network for handwriting recognition is defined by a set of input neurons, which can be activated by the pixels of an input image. After being weighted and transformed by a function determined by the network's designer, the activations of these input neurons are then passed to other downstream neurons, which are often referred to as "hidden" neurons. This process is repeated until an output neuron is activated. Thus, the activated output neuron determines (or "learns") which character was read. Multiple pre-neurons and post-neurons can be connected through an array of RSD, which naturally expresses a fully-connected neural network. In the descriptions here, any functionality ascribed to the system 400 can be implemented using the processing system 300 applies.

Additionally, in embodiments of the invention, the cloud computing system 50 can be in wired or wireless electronic communication with one or all of the elements of the system 400. Cloud 50 can supplement, support or replace some or all of the functionality of the elements of the system 400. Additionally, some or all of the functionality of the elements of system 400 can be implemented as a node 10 (shown in FIGS. 1 and 2) of cloud 50. Cloud computing node 10 is only one example of a suitable cloud computing node and is not intended to suggest any limitation as to the scope of use or functionality of embodiments of the invention described herein.

In one or more embodiments of the invention, the system 400 analyzes an input file 404 to determine a file save location in the file database 408 for the input file 404. The file analysis engine 402 analyzes the input file 404 responsive to a file save request from a user. In an alternate embodiment, the file analysis engine 402 can analyze the engine automatically without an input from the user. For example, a file might be attached as an email attachment and the file analysis engine 402 can analyze the attached file without a user performing a file save. In one or more embodiments of the invention, the file analysis engine 402 analyzes data associated with the input file 404. This data can include metadata, the content of the input file 404, header files, readme files, and the like. For example, the analysis of document files such as WORD or .PDF files can include natural language analysis, keyword searches, content analysis, and sentiment analysis. For music or video files, the analysis can include identifying music, movies, advertising, and television shows based on a short sample played and listened to by a microphone on the user device. For executable files, the analysis can include analyzing header files and readme files associated with the executable file.

In one or more embodiments of the invention, the file analysis engine 402 can utilize a machine learning engine 414 for analysis of the input file 404 and also for accessing the historical database 406. The historical database 406 can include historical data about previous file save locations for a particular user and also file save names utilized by the user in the past. The machine learning engine 414 can perform natural language processing (NLP) analysis techniques on the content of the input file 404 and the metadata associated with the input file 404. NLP is utilized to derive meaning from natural language.

The machine learning engine 414 can analyze the content of the input file 404 by parsing, syntactical analysis, morphological analysis, and other processes including statistical modeling and statistical analysis. The type of NLP analysis can vary by language and other considerations. The NLP analysis is utilized to generate a first set of NLP structures and/or features which can be utilized by a computer to identify and generate potential file save locations and, in some embodiments of the invention, potential names for an input file 404. These NLP structures include a translation and/or interpretation of the natural language input, including synonymous variants thereof. The machine learning engine 414 can analyze the features to determine a context for the features. NLP analysis can be utilized to extract attributes (features) from the natural language. These attributes include, but are not limited to, a file name, a sender name, a file author name, a location the file was sent from, a location the file was created, and the file type (e.g., .PDF, .DOC, .JPG, etc.). These extracted attributes and historical file save data can be analyzed by the file analysis engine 402 to determine one or more file save locations to save the input file 404. The file save locations can be presented to a user in the output GUI 410 and a user can select the appropriate file save location by providing and input to the output GUI 410.

In embodiments of the invention, the file analysis engine 402 can utilize a sentiment analysis engine 416 to analyze an input file 404 to determine file save locations. The sentiment analysis engine 416 may be provided by any cognitive AI. The sentiment analysis engine can process natural language to incorporate both a linguistic and statistical analysis in evaluating the context of a communication (here, an input file 404). In text analysis, the sentiment is the attitude or opinion expressed toward something. Sentiment can be positive, "sounds good", negative, "this is bad", or neutral. Sentiment can be calculated based on keywords extracted and evaluated at a keyword level. Additionally, the sentiment analysis may be capable of identifying negations, such as the term "not" and the change in sentiment from the keyword "good" when the phrase is "not" "good". The sentiment analysis may consider intensity when the terms "very" or other adjectives are utilized in combination with a keyword. Additionally, the keywords may be weighted. For instance, a positive phrase such as "like" will have a predefined positive weight, whereas the phrase "love" might have a higher predefined positive weight. Additionally, negative weights may be afforded negative phrases such as "dislike" would have a predefined negative weight and the phrase "hate" might have a higher negative weight. The sentiment analysis module can evaluate the content to provide a sentiment level. This sentiment level may also include an intensity value.

The sentiment analysis engine 416 can perform tonal analysis. The tonal analysis can use linguistic analysis to detect three types of tones from the text. The natural language content is analyzed using tonal analysis for determining the emotional impact, social tone, and writing style that the content projects. The tonal analysis may provide tonal scores for emotional tone, social tone, and language tone. For emotional tone, the tonal analysis may utilize the emotions for "joy", "fear", "sadness", "disgust" and "anger". Each natural language element is evaluated with respect to each emotion. Each emotion may be evaluated from lower values having a value range that indicates if that emotion is less likely to appear as perceived or alternatively to a higher value range if the emotion is more likely to be perceived with respect to each natural language content. Other emotions may be utilized as well as a different value score.

For social tone, the five elements of openness, conscientiousness, extraversion, agreeableness, and emotional range are utilized. Openness is evaluated as the extent a person is open to experience a variety of activities. This trait may be provided a value range indicating that it is more likely to be perceived as no-nonsense, straightforward, blunt and obvious, alternatively, a higher value range may be provided if the content indicates that it will be perceived as intellectual, curious, emotionally-aware, or imaginative. Conscientiousness is evaluated as the tendency to act in an organized or thoughtful way. This trait may be provided a value range if the presentation is perceived as spontaneous, laid-back, reckless, unmethodical or disorganized, or alternatively, a higher value range may be provided if the content is perceived as disciplined, dutiful, or confident. Extraversion is evaluated as the tendency to seek stimulation in the company of others. This trait may be provided a value range if perceived as independent, timid, introverted, restrained, boring, or alternatively, a higher value range may be provided if the content is perceived as engaging, seeking attention, assertive, sociable. Agreeableness is evaluated as the tendency to be compassionate and cooperative towards others. This trait may be provided a value range if the presentation is perceived as selfish, uncaring, uncooperative, confrontational or arrogant, or alternatively, a higher value range may be provided if the content is perceived as caring, sympathetic, cooperative, or trustworthy. The emotional range is evaluated as the tendency to be sensitive to the environment. This trait may be provided a value range if the presentation is perceived as calm, bland, content, relaxed or alternatively a higher value range may be provided if the content is perceived as concerned, frustrated angry, passionate, upset, stressed or impulsive. These tones, descriptions, and weights are merely illustrative and additional tones, descriptions or weights may be utilized.

Language tones may be analyzed to measure the user's writing style. The various styles may include analytic, confidence and tentative. The analytic style may focus on the individual's reasoning and analytical attitude about things. The analytic style may be provided a value range if the text contains little or no evidence of analytical tone or alternatively a higher value range if the presentation is more likely to be perceived as intellectual, rational, systematic, emotionless, or impersonal. The confidence style may focus on the presenter's degree of certainty. The confidence style may be provided a value range if the text contains little or no evidence of confidence in tone or alternatively a higher value range if the style is more likely to be perceived as assured, collected, hopeful or egotistical. The tentative style may focus on the presenter's degree of inhibition. The tentative style may be provided a lower value range if the text contains little or no evidence of tentativeness in tone or a higher value range if the style is more likely to be perceived as questionable, doubtful limited, or debatable. The word stemming and summation module.

In one or more embodiments, the file save engine 402 can utilize the machine learning engine 414 and/or the sentiment analysis engine 416 to determine a context for the input file 404. The context can include file subject information such as the input file 404 belonging to a specific product or project the user might be working on. For example, if the input file 404 content include language for "work project 57," the file analysis engine can utilize that context and identify file save locations that are associated with work project 57. The input file 404 content can include the name of the file and the metadata associated with the file. In addition, historical save locations can be analyzed by the file analysis engine 402 to determine potential save locations. For example, if previous input files referencing work project 57 are all saved in a specific save location, then the file analysis engine 402 can provide the specific save location as a potential save location for the user to select. Also, certain keywords such as, for example, version numbers found in the title or metadata can be analyzed by the file analysis engine 402 and saved in locations with similar titles and version numbers that are close. For example, a file titled "Draft Product Description—Version 6" can be saved in the same file save location as "Draft Product Description—Version 5."

In one or more embodiments, the file save engine 402 can analyze the metadata associated with the file to determine information about the file such as, for example, author, version number, the location of the author, and the like. The metadata can be compared to the historical information and potential save locations can be based on historic save locations for files with similar metadata.

In one or more embodiments, the output GUI 410 can present file save locations to the user. The selection made by the user can be utilized to train and tune a machine learning model utilized by the machine learning engine 414. In a sense, the machine learning model "learns" the user's preferences for file save locations and utilizes these preferences when analyzing new input files.

In one or more embodiments, the file save engine 402 can be utilized to analyze email attachment files to determine save locations in the file database. In addition to the attached file being analyzed, the file analysis engine 402 can analyze the content and/or metadata associated with the email. For example, if the email body includes references to a specific project, the file analysis engine 402 can utilize this context to provide save locations for a user. Other email attributes such as sender or subject line can be analyzed to determine file save locations. In other embodiments, the file analysis engine 402 can create potential file names for the attached file based on the email content, metadata, or other attributes.

In one or more embodiments, the file analysis engine 402 can utilize weights for attributes of an input file 404 for determining file save locations. For example, the context of the file might be given a greater or a lesser weight than the creator of the file. The weighting of the different file attributes can be combined to create a likelihood score for different file save locations for the input file 404. For example, a first file save location might have a likelihood score of 80% and a second file save location might have a likelihood score of 50%. Each of these file save locations can be presented to the user. The number of file locations presented to the user can be based on the number of file locations that exceed a threshold likelihood score. An example threshold likelihood score could be 50% or could be adjusted by the user. Also, the likelihood score could be adjusted based on historic choices of a user or adjusted by the machine learning engine 414.

In one or more embodiments, if the file analysis engine 402 is unable to locate a file save location that exceeds a threshold likelihood score as mentioned above, the file analysis engine 402 can suggest a new file save location (i.e., create a folder or location for the file) and determine a name for the file save location. The file analysis engine 402 can also present the new file save location along with existing file save locations to the user for the user to select an appropriate location.

In one or more embodiments, the file analysis engine 402 can automatically save input files 404 that exceed a likelihood score. In an alternate embodiment, the file analysis engine 402 can temporarily save an input file 404 to a file save location and await confirmation from a user before permanently saving the input file 404 to the file save location.

Figure 5:
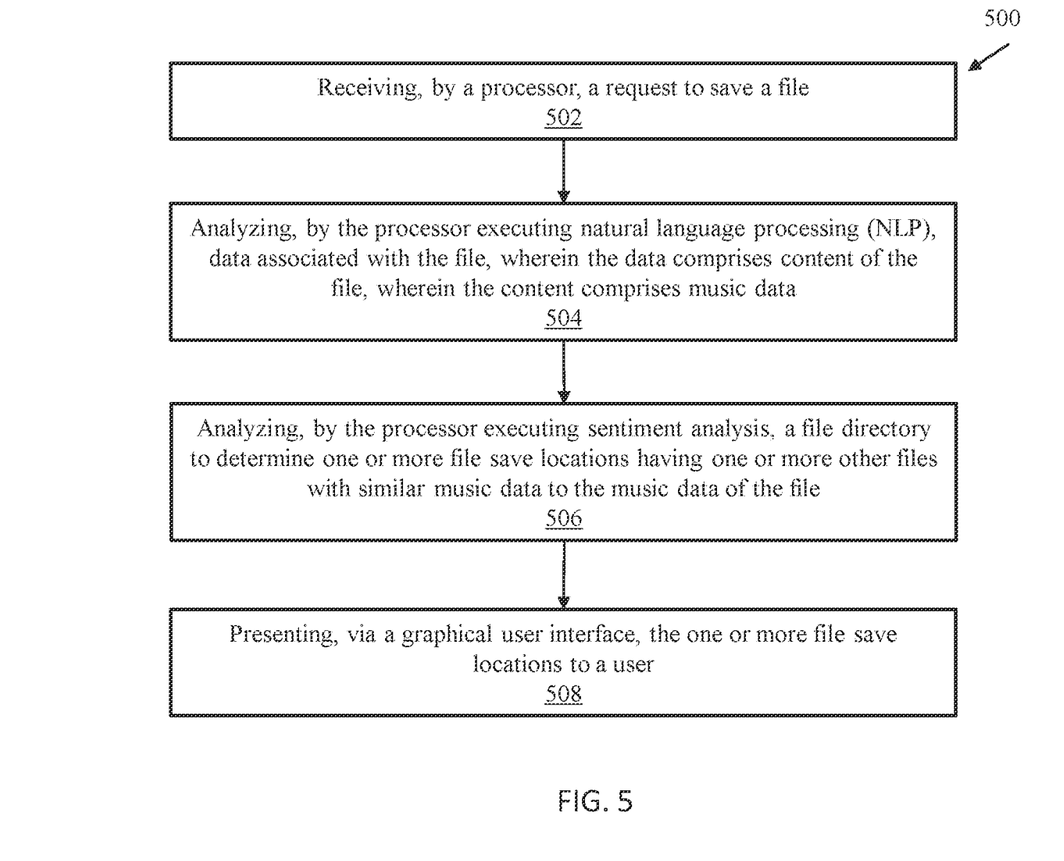
FIG. 5 depicts a flow diagram of a method for content based routing according to one or more embodiments of the invention.

FIG. 5 depicts a flow diagram of a method for a content based routing according to one or more embodiments of the invention. The method 500 includes receiving, by a processor, a request to save a file, as shown at block 502. The method 500, at block 504, includes analyzing, by the processor, data associated with the file. At block 506, the method 500 includes determining one or more file save locations for the file based on a feature vector, generated by a machine learning model, comprising a plurality of features extracted from the data associated with the file. And at block 508, the method 500 includes presenting the one or more file save locations to a user.

Additional processes may also be included. It should be understood that the processes depicted in FIG. 5 represent illustrations and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for content based routing, the method comprising:
   receiving, by a processor, a request to save a file;
   analyzing using natural language processing (NLP), by the processor, data associated with the file, wherein the data comprises content of the file, wherein the content is music data;
   analyzing using sentiment analysis, by the processor, a file directory to determine one or more file save locations having one or more other files with similar music data to the music data of the file; and
   presenting, via a graphical user interface, the one or more file save locations to a user.

2. The computer-implemented method of claim 1, further comprising:
   receiving, by the processor through the graphical user interface, an input from the user responsive to presenting the one or more file save locations, wherein the input comprises a selection of a designated file save location from the one or more file save locations; and
   saving the file to the designated file save location based at least in part on the input from the user.

3. The computer-implemented method of claim 1, further comprising:
   receiving, by the processor through the graphical user interface, an input from the user responsive to presenting the one or more file save locations, wherein the input comprises an indication rejecting the one or more file save locations; and
   updating the machine learning model based on the indication.

4. The computer-implemented method of claim 1, wherein the data associated with the file further comprises metadata of the file.

5. The computer-implemented method of claim 1 further comprising generating, by the processor, a file name for the file, based at least in part on the data associated with the file.

6. The computer-implemented method of claim 1, wherein the file is attached to an email in an email program, the email program executed by the processor; and
   wherein the determining, by the processor, the one or more file save locations for the file is further based on data associated with the email in the email program.

7. The computer-implemented method of claim 1 further comprising creating, by the processor, a new file save directory for the file based on the data associated with the file.

8. A system for content based routing, the system comprising:
   a processor communicatively coupled to a memory, the processor configured to:
   receive a request to save a file;
   analyze using natural language processing (NLP) data associated with the file, wherein the data comprises content of the file, wherein the content is music data;
   analyze using sentiment analysis a file directory to determine one or more file save locations having one or more other files with similar music data to the music data of the file; and
   present, via a graphical user interface, the one or more file save locations to a user.

9. The system of claim 8, wherein the processor is further configure to:
   receive, via a graphical user interface, an input from the user responsive to presenting the one or more file save locations, wherein the input comprises a selection of a designated file save location from the one or more file save locations; and
   save the file to the designated file save location based at least in part on the input from the user.

10. The system of claim 8, wherein the processor is further configure to:
   receive, via a graphical user interface, an input from the user responsive to presenting the one or more file save locations, wherein the input comprises an indication rejecting the one or more file save locations; and
   update the machine learning model based on the indication.

11. The system of claim 8, wherein the data associated with the file further comprises metadata of the file.

12. The system of claim 8 wherein the processor is further configure to:
   creating a file name for the file, based at least in part on the data associated with the file.

13. A computer program product for content based routing comprising a computer readable storage medium having program instructions embodied therewith, where the program instructions are executable by a processor to cause the processor to perform a method comprising:
   receiving, by the processor, a request to save a file;
   analyzing using natural language processing (NLP), by the processor, data associated with the file, wherein the data comprises content of the file, wherein the content is music data;
   analyzing using sentiment analysis, by the processor, a file directory to determine one or more file save locations having one or more other files with similar music data to the music data of the file; and
   presenting, via a graphical user interface the one or more file save locations to a user.

14. The computer program product of claim 13, further comprising:
   receiving, by the processor through the graphical user interface, an input from the user responsive to presenting the one or more file save locations, wherein the input comprises a selection of a designated file save location from the one or more file save locations; and
   saving the file to the designated file save location based at least in part on the input from the user.

15. The computer program product of claim 13, further comprising:
   receiving, by the processor through the graphical user interface, an input from the user responsive to presenting the one or more file save locations, wherein the input comprises an indication rejecting the one or more file save locations; and
   updating the machine learning model based on the indication.

16. The computer program product of claim 13, wherein the data associated with the file further comprises metadata of the file.

17. The computer program product of claim 13 further comprising generating a file name for the file, based at least in part on the data associated with the file.

* * * * *